United States Patent Office 2,926,156
Patented Feb. 23, 1960

2,926,156
EPOXY CURING AGENT

George Mayurnik, Garfield, N.J., assignor to Aries Laboratories, Inc., New York, N.Y., a corporation of New York No Drawing. Application August 2, 1954
Serial No. 447,395

6 Claims. (Cl. 260—47)

This invention relates to novel compositions of matter and to the processes for preparation thereof. More particularly, it relates to processes for preparing a novel curing agent for fusible epoxy resins and to the infusible materials resulting from employing said curing agent.

Epoxy resins containing a plurality of reactive functions have been prepared by reaction of a polyhydric material with a compound containing both an epoxy group and a hydroxyl-reactive function. As a result, fusible resinous condensation products were obtained which were essentially linear. Conventional reagents for this purpose include epichlorhydrin and bis-(4-hydroxyphenyl)-dimethyl methane, the latter refferred to in the trade as bis-phenol A.

These resins have been cured or rendered infusible by incorporation therewith of various cross-linking agents which consequently form a three dimensioned rigid lattice.

Curing agents heretofore employed for this purpose include various polyfunctional materials such as anhydrides of polycarboxylic acids, polyamides, and the like. The physical properties of the infusible material resulting from interaction with the cross-linking agent will in large part depend upon the particular polyfunctional cross-linking agent employed.

For this purpose it has been suggested previously that meta-phenylenediamine might be employed due to the fact that the infusible resins exhibited a high heat distortion point, i.e., they were relatively unaffected by heat in comparison with other infusible reaction products of the initial epoxy resins.

In spite of the superiority of meta-phenylenediamine as a curing agent for certain applications wherein the comparative insensitivity to heat of the final resin was important, the use of this material is attended with certain disadvantages which have limited its more widespread acceptance. Specifically, the substance is dark colored and difficult to handle. Because of its elevated melting point it must be melted prior to incorporation into the fusible epoxy resin which it is intended to cure. This is disadvantageous, however, since the trade prefers the use of normally liquid curing agents which may be incorporated at room conditions without initial heating.

Since the curing agents are generally mixed with the epoxy resins by unskilled personnel, the need has existed for a curing agent which can be handled more easily while still imparting the requisite heat insensitivity to the final product.

It has now been found that by suitable reaction a phenylenediamine may be combined with styrene oxide to produce a novel reaction product which is liquid at room temperature and which will impart the desired heat distortion properties to the finished, infusible epoxy resin.

Specifically, it has been found that by heating styrene oxide with from about 0.3 to about three times its weight of a phenylenediamine a novel curing agent may be obtained. The substances are heated gently to form a fluid mixture (about 140–160° F. for meta-) after which the external heating is discontinued and the reaction is permitted to proceed due to its own exothermic character. Upon completion of the reaction, the mixture is permitted to cool down to room temperature. The product is a stable, viscous liquid at room temperature.

Of the three isomeric phenylenediamines the best results are obtained with meta-phenylenediamine. However, ortho-phenylenediamine, and in some instances para-phenylenediamine, may be similarly employed alone or in admixture with each other and/or the meta-isomer. The procedures in all cases are similar.

A weight ratio of 2 parts of the phenylenediamine per part of styrene oxide is especially suited for preparation of the epoxy curing agent since the condensation product has a viscosity approximately equal to that of the fusible epoxy resin starting material. Consequently, the fusible resin and curing agent can be mixed readily and homogeneously without stratification and without heating.

The novel curing agent may be prepared by the following illustrative procedure:

*Example I*

Into a vessel there are added two pounds of meta-phenylenediamine and one pound of styrene oxide. The vessel is placed upon a hot plate and the mixture is gradually heated to about 150° F. The supply of heat is then cut off and the reaction, which is highly exothermic, is permitted to proceed until the temperature attains a maximum and then begins to fall off. The contents of the vessel are then cooled down to room temperature and there are obtained about 3.0 pounds of a highly viscous liquid. Tested after two months the condensation product is stable, retaining its fluidity and curative properties.

If the reaction mass is large, the exothermic heat of reaction may result in generation of a high temperature. Care should be taken to prevent the temperature from rising considerably above 300° F. and, if necessary, external cooling may be employed for this purpose.

The liquid curing agent obtained in the manner illustrated may be admixed with a molten epoxy resin and the mass allowed to cure at elevated temperature.

The fusible intermediate polyepoxide resin to be cross-linked or set with the novel curing agent is structurally a polyether of an epoxy containing alcohol and a polyhydric phenol. Suitable polyhydric phenols may be mononuclear compounds possessing two or more nuclear hydroxyl groups such as resorcinol, hydroquinone, catechol, and the like. Polynuclear phenols may similarly be employed and among these are the polyhydroxy derivatives of diphenyls, diphenyl methanes, naphthalenes, and polynapthalenes, such as bis-(4-hydroxyphenyl)-methane, bis-(4-hydroxyphenyl)-dimethyl methane, 4,4'-dihydroxydiphenyl, 1,5-dihydroxy naphthalene, and the like.

The epoxy groups are introduced by reacting the polyhydric phenol with an epihalohydrin or a diepoxide. The preparation of these fusible, resinous starting materials is known in the art and it is generally effected by contacting the reactants in the presence of an alkali such as sodium hydroxide at elevated temperature. The reaction product may generally be designated as a glycidyl polyether.

It is probable that the chain growth does not proceed smoothly. Analytical data indicates that there is branching of the molecule and some repetition of epoxy units so that the product requires the presence of an excess of epichlor-hydrin. At the terminal of each branch of the molecule there will be an epoxy group so that each molecule will contain at least two such radicals, and possibly as many as four, when sufficient excess of the epoxy-containing compound is employed.

The epoxy intermediate fusible resins may be further identified by the number of epoxy groups per molecule which should be more than 1, and preferably about 2, corresponding to a substantial excess of epoxy-containing compounds with respect to the polyhydric phenyl.

The chain growth can be continued to the point where the intermediate fusible product to be cured in accordance with the present invention becomes a brittle, fusible solid. This occurs at a molecular weight of about 2000. The molecular weight may be varied, however, by regulating the proportions of the reagents. Large excesses of the epichlorhydrin tend to decrease the molecular weight and to increase the amount of branching. Molecular weights of about 500 to 3000 are suitable, while 800 to 1500 represents a preferred range. This corresponds approximately to an epoxy equivalent of about .450 per 100 grams of intermediate epoxy resin.

Where the epoxy intermediate resin is solid at room temperature it may be melted and combined with the novel curing agent as produced in Example I. By maintaining the mixture at elevated temperature for several hours a fully cured resin may be obtained which exhibits the requisite heat insensitivity.

The novel curing agent of the present invention, however, is particularly adapted for cross-linking epoxy intermediate resins which are liquid at room temperature, such as those having a molecular weight of about 800 to 1500. Where the epoxy resin is normally liquid it need only be stirred with the curing agent which is also liquid and the mass will set to a solid. Preferably, however, the mass, after setting, will be subjected to a heat cure. For each 100 grams of epoxy intermediate there may be employed about 15 to 35 grams of the novel curing agent, and the cure may be completed after the initial setting. The time and temperature of the cure are interrelated and may be varied considerably. A preferred range of curing agent per 100 grams of fusible epoxy resin is 20 to 30 grams.

The following example is illustrative of the preparation of a final infusible epoxy resin employing the novel curing agent:

*Example II*

To 100 grams of Ciba Araldite 503 (a liquid intermediate resin prepared by condensing epichlorhydrin with bis-phenol A, having an epoxy equivalent /100 grams of .450, a viscosity at 30° C. of about 30,000 cps., a specific gravity of 1.16, and an esterification equivalent/100 grams of .95) there are added 25 grams of the curing agent obtained in Example I. The mass is stirred to mix the components intimately and is then allowed to stand at room temperature for three hours. The cure is then completed at 125° in three hours.

As can be seen from the above example, the curing is exceedingly simple and may readily be performed even by unskilled personnel. This is particularly advantageous since in the application to which the resins are put the personnel is generally unfamiliar with laboratory procedures and oftentimes hot plates and the like are not available at the point where the initial cure is to be effected. Various changes and modifications may be made without departing from the spirit and scope of the present invention and it is intended that such obvious changes and modifications be embraced by the annexed claims.

Having thus described the invention, what is claimed and desired to be secured by Letters Patent is:

1. An infusible resin comprising a glycidyl polyether of a polyhydric phenol having an epoxy equivalency greater than 1.0 cured with a heat condensation product of styrene oxide and from about .3 to about 3 times the weight of meta-phenylenediamine.

2. An infusible resin comprising a glycidyl polyether of a di-(hydroxyphenyl)-methane cured with about 15 to 35 grams per 100 grams of polyether of a heat condensation product of styrene oxide and from about .3 to about 3 times the weight of meta-phenylenediamine.

3. An infusible resin comprising a fusible liquid glycidyl polyether of bis-(4-hydroxyphenyl)-dimethyl methane cured with about 25 grams per 100 grams of polyether of a heat condensation product of styrene oxide and about twice the weight of meta-phenylenediamine.

4. The process for curing a glycidyl polyether of a polyhydric phenol having an epoxy equivalency greater than 1.0 which comprises mixing said polyether with a condensation product produced by heating styrene oxide and from about 0.3 to about 3 times the weight of meta-phenylenediamine.

5. The process for curing a glycidyl polyether of a polyhydric phenol having an epoxy equivalency greater than 1.0 which comprises mixing said polyether with about 15 to 35 grams per 100 grams of polyether of a heat condensation product of styrene oxide and from about .3 to about 3 times the weight of meta-phenylenediamine, and thereafter heating said mass.

6. The process for curing a fusible liquid glycidyl polyether of bis(4-hydroxyphenyl)-dimethyl methane with about 25 grams per 100 grams of polyether of a heat condensation product of styrene oxide and about twice the weight of meta-phenylenediamine, permitting said mixture to set at room temperature, and thereafter heating said mass to thereby form an infusible solid.

References Cited in the file of this patent

UNITED STATES PATENTS

| | | |
|---|---|---|
| 2,528,932 | Wiles et al. | Nov. 7, 1950 |
| 2,576,458 | Hill et al. | Nov. 27, 1951 |
| 2,651,589 | Shokal et al. | Sept. 8, 1953 |
| 2,801,229 | DeHoff et al. | July 30, 1957 |